United States Patent

Bauer et al.

Patent Number: 5,079,992
Date of Patent: Jan. 14, 1992

[54] LONGITUDINALLY CONTROLLABLE ADJUSTMENT DEVICE

[76] Inventors: Hans J. Bauer, Am Eichenhain 8; Ludwig Stadelmann, Schopperstrasse 14, both of D-8503 Altdorf; Herbert Wolf, Brosamer Strasse 10, D-8500 Nürnberg, all of Fed. Rep. of Germany

[21] Appl. No.: 550,923

[22] Filed: Jul. 11, 1990

[30] Foreign Application Priority Data

Jul. 26, 1989 [DE] Fed. Rep. of Germany ... 8909051[U]

[51] Int. Cl.$^5$ .............................................. F15B 11/08
[52] U.S. Cl. ........................................ 91/422; 91/222; 91/428; 92/165 R; 92/168; 267/131
[58] Field of Search ...................... 267/131, 64.12, 124; 188/300, 322.17, 319, 322.13, 322.15, 322.16, 322.22; 91/422, 222, 428; 92/165 R, 168

[56] References Cited

U.S. PATENT DOCUMENTS

| | | | |
|---|---|---|---|
| 3,236,515 | 2/1966 | Ackerman | 188/300 X |
| 3,293,994 | 12/1966 | Napolitano | 92/165 R |
| 3,388,883 | 6/1968 | Axthammer et al. | 188/300 |
| 3,825,244 | 7/1974 | Bauer | 267/133 |
| 4,072,288 | 2/1978 | Wirges et al. | 188/300 |
| 4,245,826 | 1/1981 | Wirges | 267/131 |
| 4,318,536 | 3/1982 | Bauer | 267/64.12 |
| 4,445,598 | 5/1984 | Brambilla | 188/322.17 X |
| 4,570,912 | 2/1986 | Dodson et al. | 267/124 X |
| 4,616,812 | 10/1986 | Tornero | 267/131 |
| 4,627,332 | 12/1986 | Furuta et al. | 92/168 |
| 4,632,228 | 12/1986 | Oster et al. | 188/300 X |
| 4,709,790 | 12/1987 | Freitag et al. | 188/300 |
| 4,747,758 | 5/1988 | Sauerwein | 91/275 X |
| 4,750,594 | 6/1988 | Siemann et al. | 188/300 X |
| 4,842,162 | 6/1989 | Merkel | 91/361 X |
| 4,856,762 | 8/1989 | Selzer | 267/64.12 |
| 4,948,104 | 8/1990 | Wirges | 188/322.17 |
| 4,949,941 | 8/1990 | Bauer et al. | 188/300 X |

FOREIGN PATENT DOCUMENTS 2807391 8/1978 Fed. Rep. of Germany ...................... 188/322.17

Primary Examiner—Edward K. Look
Assistant Examiner—Todd Mattingly
Attorney, Agent, or Firm—Browdy and Neimark

[57] ABSTRACT

A longitudinally controllable adjustment device comprises a cylindrical housing, in which a piston rod with a piston is slidable and sealingly extending outwards. Furthermore it comprises a valve for controlling length adjustment of the device. In order to avoid a destruction of seals preventing a flow to the outside of pressure medium at least two seals are provided between the housing and the piston rod whereby a seal between the outer end of the housing and a further seal prevents an inflow of gas and in particular of liquid from the outside into the housing.

15 Claims, 2 Drawing Sheets

LONGITUDINALLY CONTROLLABLE ADJUSTMENT DEVICE

FIELD OF THE INVENTION

The invention relates to a longitudinally controllable adjustment device, comprising a cylindrical housing closed at one end and filled with a pressure medium, a piston rod sealingly extending from the other end of the housing and slidable therein, a piston disposed in the housing and sealingly guided against the inner wall thereof, the piston being fixedly connected with the piston rod and slidable together with the piston rod and which divides the inner chamber of the housing into two partial chambers, and a valve for connecting or separating the two partial chambers comprising a valve body actuatable by means of a slidably and sealingly guided trigger pin, a seal being provided at the other end of the housing, which seal abuts at least on the piston rod and prevents any flow of pressure media along the piston rod out of the housing, and a seal being provided in the valve, which seal abuts on the trigger pin and prevents a flow of pressure medium out of the valve to the outside.

BACKGROUND OF THE INVENTION

There are two basic groups of such adjustment devices. The one group is known, for example, from published, non-examined European patent application 0 324 184. In this group of adjustment devices the valve is disposed in the piston. In the other group of adjustment devices, as for example known from U.S. Pat. No. 3 656 593, the valve is disposed in that end of the housing which is opposite the side where the piston rod exits. Both types of adjustment devices are at least partially filled with gas, by means of which, when the valve is opened, the piston rod can be pushed out of the housing or it can be pushed back in against the force of its pressure. If the piston itself is slidable in a fluid-filled chamber, then a complete, i.e., for all practical purposes rigid, arrestment of this adjustment device, which can also be called a gas spring, becomes possible. If, however, the entire housing is filled with pressure gas, a spring potential having a very steep space-force curve is possible, even with the valve closed. The pressure in the housing of the respective adjustment device is very high and amounts as a rule to 80 bar, but it may also be much higher. In order to keep the adjustment devices functioning a long time, seals must be provided that will effectively prevent a flow of pressure medium to the outside on a long-term basis. These seals must simultaneously be highly resistant to wear, since, depending on the use of the adjustment device, movements arise to a large extent between the seal and the piston rod on the one hand and between the seal and the trigger pin on the other hand. Polyurethane has, for example, proved very reliable as a sealing material highly resistant to wear. When such adjustment devices are used in an aggressive environment, i.e. even in the case of high atmospheric humidity, it has been found that the seals preventing a flow of pressure medium to the outside are destroyed in too short a period of time, which amounts to a destruction of the entire adjustment device.

SUMMARY OF THE INVENTION

It is accordingly the object of the invention to embody the adjustment devices of the generic type in such a way that a premature destruction of the seals preventing a flow to the outside of pressure medium is avoided.

This object is attained in accordance with the invention by a further seal being provided between the other end and at least the seal abutting on the piston rod, which seal prevents an inflow of gas and in particular of liquid from the outside into the housing. The mostly strained area, which is simultaneously the largest area to be sealed, is in the vicinity of the piston rod exit. To this extent it is particularly important to prevent an inflow of gas and in particular of liquid from the outside into the gas spring at this place. In order to provide a corresponding sealing also towards the inner wall of the housing at the piston rod exit, it may further be of advantage if an additional seal is provided between the other end of the housing and a seal preventing a flow of pressure medium out of the housing along its inner wall, which additional seal prevents an inflow of gas and in particular of liquid into the housing.

It is equally significant to provide a corresponding seal preventing an inflow of gas and in particular of liquid into the valve being arranged in a direction towards the trigger pin between the seal provided in the valve and the outside and preventing a flow of pressure medium into the valve, although this is not as important as at the piston rod exit, since the surfaces to be sealed are smaller, and since the actuation of the valve does by far not take place as often as there are movements of the piston rod relative to the housing.

According to further features of the invention it is advantageous if the seals preventing a flow to the outside of pressure medium consist of a sealing material highly resistant to wear, in particular of polyurethane. Furthermore, seals preventing an inflow of gas and in particular of liquid from the outside consist of a material resistant to aggressive media, such as rubber or a PTFE compound. A lower pretension of the seals preventing an inflow of gas and in particular liquid into the housing serves to achieve that the wear of the seals due to friction is reduced to a minimum without their function being affected, namely to prevent an inflow of liquid and possibly gas from the atmosphere. On the other hand these measures further make it possible to make the seals preventing a flow of pressure medium to the outside out of a material that is not resistant to water or other aggressive media.

Further advantages and features of the invention will become apparent from the ensuing description of two examples of embodiment taken in conjunction with the drawing.

DETAILED DESCRIPTION OF THE PREFERRED EMBODIMENTS

Figure 1:
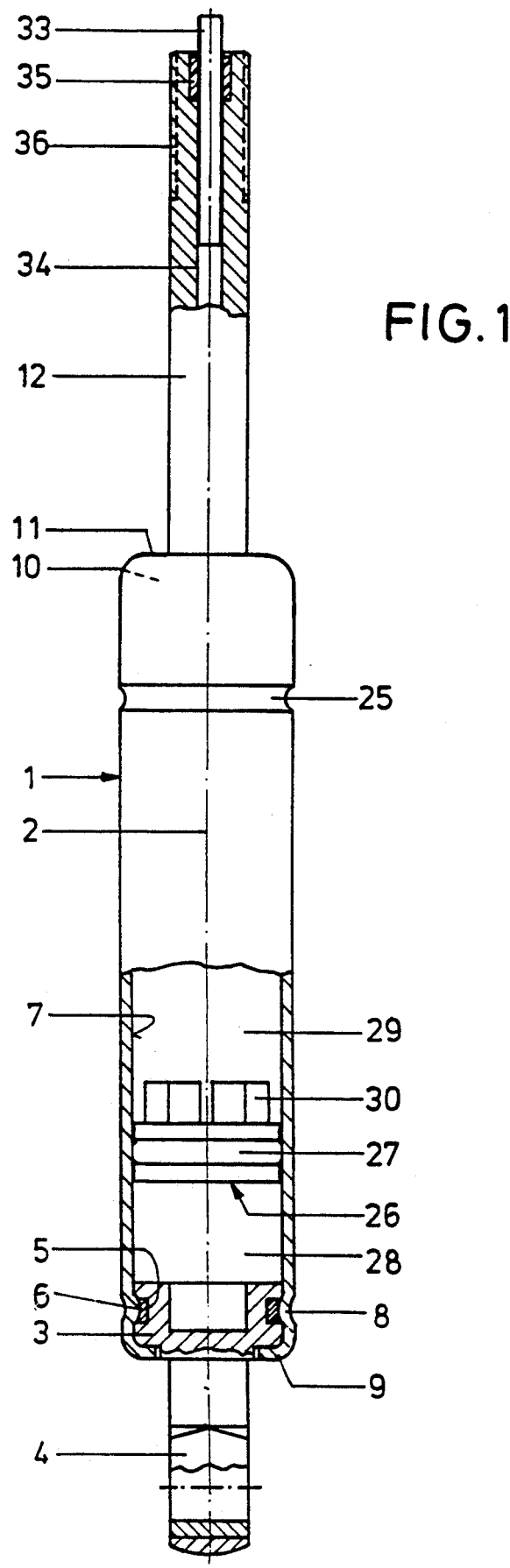
FIG. 1 is a vertical view in a partly broken up representation of a longitudinally controllable admustment device in accordance with the invention.
Figure 2:
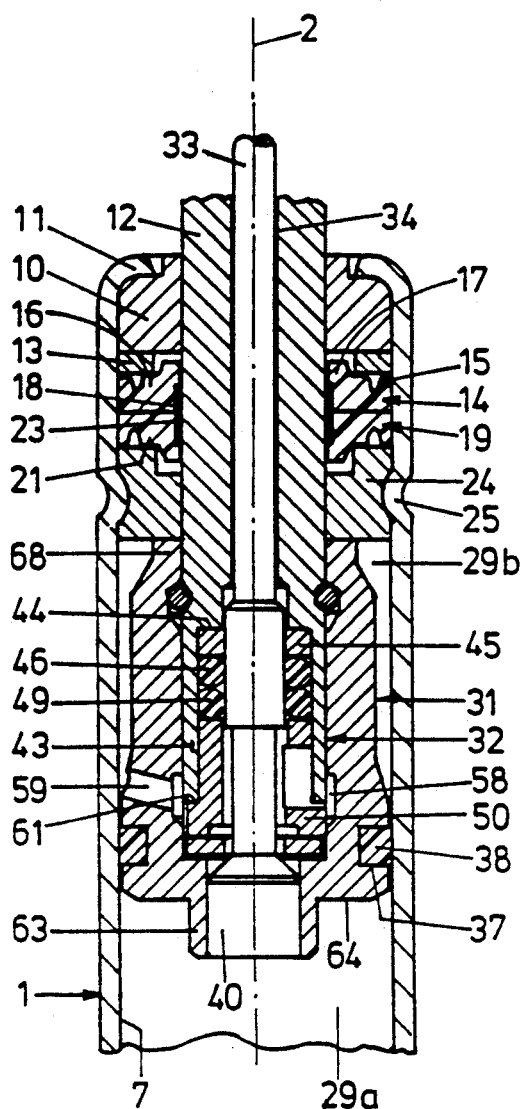
FIG. 2 is a partial longitudinal section of FIG. 1 on a larger scale.
Figure 3:
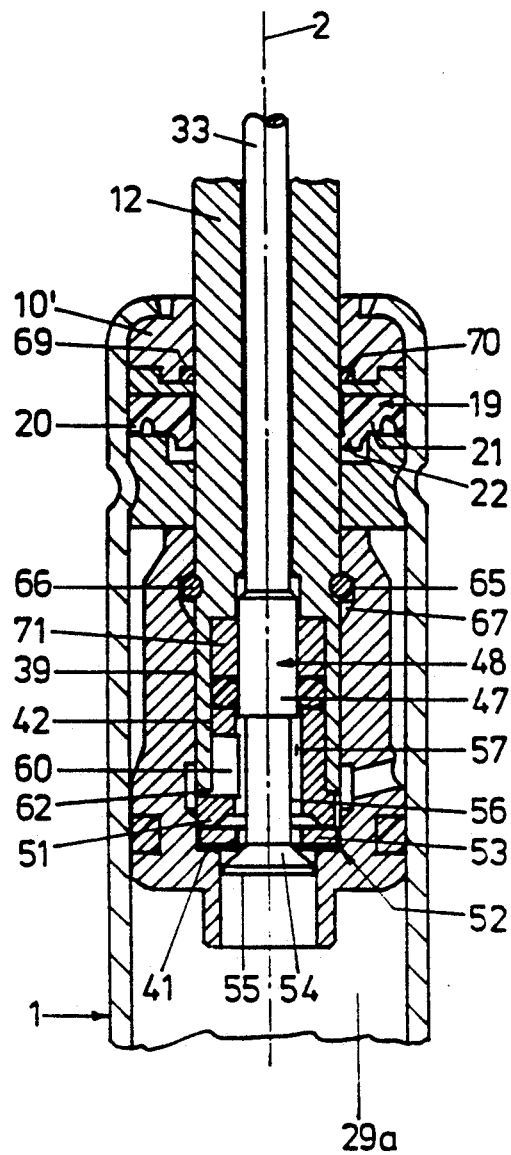
FIG. 3 is a partial longitudinal section of a modified embodiment in a representation corresponding to FIG. 2.

FIG. 1 shows an adjustment device designed as a rigidly arrestable gas spring, with FIG. 2 and 3 each showing similar sections of FIG. 1. The following description, therefore, mainly refers to all three drawings, with, for clearness purposes, the reference numerals partly not being indicated in each of the three FIGURES, even though the corresponding part is shown. It has a cylindrical housing 1 made, for example, out of a steel pipe, having a center longitudinal axis 2. The housing 1 is closed at one end by means of a plug closure 3 on which a so-called eye is disposed as fastening member 4. At its circumference the plug closure 3 has a groove 5 in which an annular seal 6 is disposed, which sealingly abuts on the inner wall 7 of the housing 1. The plug closure 3 is fixed in relation to the housing 1 in the direction of the axis 2 by the housing having a crimp 8 pressed against the seal 6 and into the groove 5. Furthermore, the associated end of the housing 1 is provided with a bead 9 grasping the plug closure 3 from the outside.

The other end of the housing 1 is provided with a guide bush 10 disposed concentrically to the axis 2, which is also grasped on its outside by a bead 11 of the housing. Inside the guide bush 10, a piston rod 12, disposed concentrically to the axis 2 and extending from the housing, is guided slidably in its longitudinal direction.

A support ring 13 bears against the guide bush 10 and the inner wall 7 of the housing 1, the inner diameter of which is clearly smaller than the outer diameter of the piston rod 12. It is immediately followed by a first seal 14 serving to seal against the inflow of liquid and possibly of gas from the outside into the housing 1, with, in the first place, sealing being provided against liquids penetrating in microscopically fine quantities. It has a sealing lip 15 directed towards the end of the housing 1 and adjoining the inner wall 7, thus sealing against the inflow of media into the housing between the guide bush 10 and the inner wall 7, although there will as a rule be no inflow of media this way. A support collar 16 of the seal 14 further bears against the support ring 13, thus fixing the seal 14 in its axial position in relation to the guide bush 10. Thus the sealing lip 15 cannot be axially compressed; it freely lies before the support ring 13. The seal 14 is further provided with a sealing web 17 adjoining the piston rod 12, which sealing web 17 equally seals against an inflow of media between the guide bush 10 and the piston rod 12. A bracing sleeve 18 is arranged below this sealing web 17 in the seal 14 and supports both the sealing web 17 and the seal 14 against the piston rod 12. On the side of the seal 14 facing away from the guide bush 10 a further seal 19 abuts on the seal 14 and is identical in shape with the seal 14, but arranged in mirror-symmetry to the seal 14, thus sealing against any flow to the outside of gas out the housing 1. It has consequently a sealing lip 20 adjoining the inner wall 7 and being directed into the housing, a support collar 21, a sealing web 22 adjoining the piston rod 12 and a bracing sleeve 23. The support collar 21 bears against a support ring 24, which is held axially in the direction towards the inside of the housing by being axially fixed by means of a crimp 25 pressed into the housing 1.

The housing 1 is closed on both of its ends sealed against gas and liquid by the steps described. A separating piston 26, slidable in the direction of the axis 2, is disposed inside the housing 1, which tightly adjoins the inner wall 7 of the housing by means of an O-ring-shaped seal 27. Between the separating piston 26 and the plug closure 3, a gas chamber 28 filled with a gas under pressure is formed, which is sealed against inflow of air and the liquid from the housing chamber serving as liquid chamber 29 between the separating piston 26 and the seal 19. Spacers 30 are provided on the separating piston 26 in the liquid chamber 29.

At the inner end of the piston rod 12 located inside the liquid chamber 29, a piston 31 with an integrated valve 32 is disposed. The valve 32 is operated from the outside by means of a trigger pin 33 in the shape of a thin bar, which is disposed in a bore 34 in the piston rod 12 extending concentrically to the axis 2. At the outer end of the piston rod 12 a seal 35 is disposed, which prevents the entry of dirt into the bore 34 and thus into the area of the valve 32 and which simultaneously serves as a kind of friction brake by means of which unintentional falling out of the trigger pin 33 out of the bore 34 is prevented. It primarily serves as a kind of coarse seal. The piston rod 12 is furthermore provided at this outer end with an outer thread 36, to which can be attached a fastening device, not shown.

The piston 31 is provided with a groove 37 on its exterior, in which an O-ring-shaped seal 38 is disposed which sealingly abuts on the inner wall 7 of the housing 1. It divides the liquid chamber 29 into two partial liquid chambers 29a and 29b, the partial liquid chamber 29a extending between the seal 38 and the separating piston 26 and the partial liquid chamber 29b extending between the seal 38 and the seal 19.

The piston 31 is designed in the shape of a sleeve. It has a receptacle 39, cylindrical to the axis 2, for the piston rod 12. The piston rod 12 is maintained without radial play in this receptacle 39. The receptacle 39 has a conduit-like opening 40 which ends in the partial liquid chamber 29a and is in the shape of a bore concentric to the axis 2. Between the receptacle 39 and the opening 40, an annular bottom 41 of the receptacle 39 is formed.

On its end located inside the piston 31, the piston rod 12 is provided with a cylindrical bore 42 coaxial to the axis 2; the wall remaining in this area forms a valve housing 43 with an annular bottom 44 extending radially to the axis 2. A ring 45 abutting on the bottom 44 has been inserted into this valve housing 43. On the side facing away from the bottom 44, an O-ring-shaped seal 46 abuts on the ring 45, which sealingly adjoins on one side the valve housing 43 and on the other a cylindrical guide section 47 of a valve body 48. In turn, a further O-ring-shaped seal 49 abuts against the seal 46, which equally, on the one hand, sealingly abuts on the valve housing 43 and, on the other hand, on the cylindrical guide section 47 of the valve body 48, while the seal 46 primarily seals against the inflow from the outside of liquids and possibly gasses in microscopically fine quantities, the seal 49 seals against the flow to the outside of liquids and/or gasses. A support and guide bush 50 abuts in turn on the seal 49 and grasps the valve housing 43 with an outwardly protruding annular collar 51, thus being axially fixed against the piston rod 12.

A seal 52 is disposed between the annular collar 51 and the annular bottom 41. It has an interior ring 53, which is used for stabilization and made of a rigid material, such as a metal or a sufficiently hard plastic. The seal 52 sealingly adjoins on one side the receptacle 39, and on the other side the annular bottom 41 and the annular collar 51 opposite it. The seal abuts on a sealing face 54, widening in the shape of a truncated cone, of a valve disk 55 of the valve body 48 located in the opening 40.

A section 56, tapered with respect to the guide section 47, immediately follows the truncated-cone-shaped sealing face 54, the outer diameter of which section is noticeably smaller than the inner diameter of the support and guide bush 50, so that an overflow chamber 57 is formed between these two.

In the receptacle 39, in the area of the transition between the valve housing 43, i.e., the piston rod 12, and the annular collar 51, an annular conduit 58 is formed and which therefore is partially covered towards the inside by the valve housing 43 and the annular collar 51. This annular conduit 58 is connected via an overflow opening 59 with the partial liquid chamber 29b.

A slit-like opening 60 is formed radially opposite the overflow opening 59 in the support and guide bush 50 and extends parallel to the axis 2. In the front end 61 of the valve housing 43, a throttle opening 62 is associated with it, which is open towards the annular conduit 58. Thus liquid can flow from the partial liquid chamber 29b via the conduit-like overflow opening 59, formed by a bore, into the annular conduit 58 and then, on the diametrically opposite side, through the throttle opening 62 and the opening 60 into the overflow chamber 57. Naturally, the flow can also be in the opposite direction.

If, by pressing the trigger pin 23 into the piston rod 12, the valve body 48 is displaced in the direction towards the partial liquid chamber 29a, the tapered section 56 is placed in front of the seal 52, which, because of the relatively small diameter of the section 56, does not adjoin it. The sealing effect between the valve body 48 and the valve housing 43 is thus removed. In this case the liquid can flow out of the overflow chamber 57 along the inside of the seal 52 into the opening 40 and from there into the partial liquid chamber 29a or in the reverse direction.

During these displacement moves the valve disk 55 remains in the conduit-like opening 40, which extends beyond the front face 64 of the piston 31 forming a protective pipe 63. If, in a borderline case, with the piston rod 12 completely pushed in, the piston 31 meets the separating piston 26, the spacers 30 come into contact with the front face 64, so that even then liquid can flow freely into the opening 40 or out of the opening 40.

The piston 31 is fixed with its end facing away from its front face 64 on the piston rod 12 in the area behind the valve housing 43. Here the piston rod 12 has an annular groove 65 with a graduated circle cross section, into which a securing ring 66 with a circular cross section is inserted. The piston 31 is provided on its open side opposite the annular bottom 41 in the non-deformed state with a bore 67 extending coaxially to the axis 2. After assembling the valve 32 and the piston 31 in the manner described above, the piston 31 is deformed in the area of this bore 67 in the direction of the piston rod 12. It then axially adjoins the securing ring 66 and, in its exterior end area, the piston rod 12 with its tapered section 68. In the course of this deformation, the piston 31 is axially stressed against the valve 32, the seal 52 being axially compressed between the annular bottom 41 and the annular collar 51.

The example of embodiment according to FIG. 3 differs in two aspects from the embodiment according to FIG. 1. Insofar as identical parts are used, identical reference numerals are used without a new description. Provided parts are used which are only slightly different in construction but have the same function, the same reference numeral is used with a prime. The sealings to the outside are different in design in the area of the end where the piston rod exits and in the valve 32. The guide bush 10' is designed to be separated, so that an annular groove 69 can be provided which is open towards the piston rod 12 and into which an O-ring-shaped seal 70 can be inserted sealing to the outside between the guide bush 10' and the piston rod 12, thus preventing an inflow of media from the outside into the housing 1. The seal 19 sealing against any flow to the outside of media out of the housing directly abuts on the guide bush 10'. In this area no specific seal is provided to prevent the inflow of media in the area between the guide bush 10' and the inner wall 7 of the housing 1. On the one hand, the the fact that the housing 1 grasps the guide bush 10' assures that the inner wall 7 adjoins the guide bush 10' very closely; on the other hand, this embodiment is to be provided particularly in such cases when the inflow of media from the outside into the housing is not too extreme.

Instead of the ring 45 and the seal 46 sealing against the inflow of media through the piston rod 12 of the example of embodiment according to FIG. 2, a sealing sleeve 71 is provided in the example of embodiment according to FIG. 3, fulfilling the function of sealing against an inflow of media from the outside and simultaneously serving as a support for the seal 40.

The seals 14, 70 and 46, 71 serving to prevent any inflow of media from outside into the housing consist of a material resistant to the media penetrating from outside. On the one hand this may be one of the many types of rubber, but also a PTFE compound (a polytetrafluoroethylene compound). Since these seals need not seal against the pressures of 80 bar or more prevailing inside the housing, they need as a rule not be braced too strongly so that the wear is little in the area where friction arises due to movements of the piston rod 12 relative to the seals 14, 70 or of the guide section 47 relative to the seals 46 or 71.

The other seals 19, 49 serving to prevent any flow out of the housing of the media which are under high pressure may, however, be made of a a sealing material highly resistant to wear, such as polyurethane, which in turn is subject to decomposition under the influence of water. However, this water possibly penetrating from outside is sealed off in the described manner.

What is claimed is:

1. A longitudinally controllable adjustment device, comprising:

a cylindrical housing (1) having an inner wall (7) limiting an inner chamber closed at one end and filled with a pressure medium;

a piston rod (12) sealingly extending from another end of the housing (1) and slidable therein; a piston (31) disposed in the housing (1) and sealingly guided against the inner wall (7) thereof, the piston (31) being fixedly connected with the piston rod (12) and slidable together with the piston rod (12) and which divides the inner chamber of the housing (1) into two partial chambers (29a, 29b);

a valve (32) for connecting or separating the two partial chambers (29a, 29b) comprising a valve body (48) actuatable by means of a slidably and sealingly guided trigger pin (33);

first seal means for preventing any flow of pressure media along said piston rod out of said housing, said first seal means comprising a first seal (19) being provided at the other end of the housing (1), which seal abuts on the piston rod (12) with comparatively great pretension;

second seal means for preventing flow of pressure medium out of said valve (32) to the outside, said second seal means comprising a second seal (49)

being provided in the valve (32), which seal abuts on the trigger pin (33); and third seal means for preventing an inflow of fluid from the outside into the housing along said piston rod, said third seal means comprising a third seal (14, 70) provided between the other end of said housing and said first seal (19), said third seal abutting on the piston rod (12) with only little pretension.

2. An adjustment device in accordance with claim 1, wherein an additional seal (14) is provided between the other end of the housing and a seal (19) preventing a flow of pressure medium out of the housing (1) along its inner wall (7), which additional seal prevents an inflow of gas and in particular of liquid into the housing (1).

3. An adjustment device in accordance with claim 1, wherein a seal (46, 71) preventing an inflow of gas and in particular of liquid into the valve (32) is arranged in a direction towards the trigger pin (33) between the seal (49) provided in the valve (32) and the outside and prevents a flow of pressure medium into the valve.

4. An adjustment device in accordance with claim 1, wherein the at least one seal (19, 40) preventing a flow to the outside of pressure medium and the at least one seal (14, 46, 70, 71) preventing an inflow of gas and in particular of liquid from the outside are arranged directly adjacent to each other.

5. An adjustment device in accordance with claim 1, wherein the at least one seal (14, 46, 70, 71) preventing an inflow of gas and in particular of liquid from the outside consist of a material resistant to aggressive media, such as a PTFE compound.

6. A longitudinally controllable adjustment device comprising:
- a cylindrical housing (1) having an inner wall (7) limiting an inner chamber closed at one end and filled with a pressure medium;
- a piston rod (12) sealingly extending from another end of the housing (1) and slidable therein; a piston (31) disposed in the housing (1) and sealingly guided against the inner wall (7) thereof, the piston (31) being fixedly connected with the piston rod (12) and slidable together with the piston rod (12) and which divides the inner chamber of the housing (1) into two partial chambers (29a, 29b);
- a valve (32) for connecting or separating the two partial chambers (29a, 29b) comprising a valve body (48) actuatable by means of a slidably and sealingly guided trigger pin (33);
- first seal means for preventing any flow of pressure media along said piston rod out of said housing, said first seal means comprising a first seal (19) being provided at the other end of the housing (1), which seal abuts on the piston rod (12), said first seal consisting of a sealing material highly resistant to wear;
- second seal means for preventing flow of pressure medium out of said valve (32) to the outside, said second seal means comprising a second seal (49) being provided in the valve (32), which seal abuts on the trigger pin (33); and
- third seal means for preventing an inflow of fluid from the outside into the housing along said piston rod, said third seal means comprising a third seal (14, 70) provided between the other end of said housing and said first seal (19) and abutting on the piston rod (12), said third seal consisting of a material resistant to aggressive media.

7. An adjustment device according to claim 6 wherein said first seal consists of polyurethane and said material of said third seal is selected from the group consisting of rubber and a PTFE compound.

8. An adjustment device in accordance with claim 6, wherein an additional seal (14) is provided between the other end of the housing and a seal (19) preventing a flow of pressure medium out of the housing (1) along its inner wall (7), which additional seal prevents an inflow of gas and in particular of liquid into the housing (1).

9. An adjustment device in accordance with claim 6, wherein a seal (46, 71) preventing an inflow of gas and in particular of liquid into the valve (32) is arranged in a direction towards the trigger pin (33) between the seal (49) provided in the valve (32) and the outside and prevents a flow of pressure medium into the valve.

10. An adjustment device in accordance with claim 6, wherein the at least one seal (19, 49) preventing a flow to the outside of pressure medium and the at least one seal (14, 46, 70, 71) preventing an inflow of gas and in particular of liquid from the outside are arranged directly adjacent to each other.

11. A longitudinally controllable adjustment device, comprising:
- a cylindrical housing (1) having an inner wall (7) limiting an inner chamber closed at one end and filled with a pressure medium;
- a piston rod (12) sealingly extending from another end of the housing (1) and slidable therein; a piston (31) disposed in the housing (1) and sealingly guided against the inner wall (7) thereof, the piston (31) being fixedly connected with the piston rod (12) and slidable together with the piston rod (12) and which divides the inner chamber of the housing (1) into two partial chambers (29a, 29b);
- a valve (32) for connecting or separating the two partial chambers (29a, 29b) comprising a valve body (48) actuatable by means of a slidably and sealingly guided trigger pin (33);
- first seal means for preventing any flow of pressure media along said piston rod out of said housing, said first seal means comprising a first seal (19) being provided at the other end of the housing (1), said first seal abutting on the piston rod (12) with comparatively great pretension and being formed of a sealing material highly resistant to wear;
- second seal means for preventing flow of pressure medium out of said valve (32) to the outside, said second seal means comprising a second seal (49) being provided in the valve (32), which second seal abuts on the trigger pin (33); and
- third seal means for preventing an inflow of fluid from the outside into the housing along said piston rod, said third seal means comprising a third seal (14, 70) provided between the other end of said housing and said first seal (19), said third seal abutting on the piston rod (12) with only little pretension being formed of a material resistant to aggressive media.

12. An adjustment device according to claim 11 wherein said first seal consists of polyurethane and said material of said third seal is selected from the group consisting of rubber and a PTFE compound.

13. An adjustment device in accordance with claim 11, wherein an additional seal (14) is provided between the other end of the housing and a seal (19) preventing a flow of pressure medium out of the housing (1) along its inner wall (7), which additional seal prevents an inflow of gas and in particular of liquid into the housing (1).

14. An adjustment device in accordance with claim 11, wherein a seal (46, 71) preventing an inflow of gas and in particular of liquid into the valve (32) is arranged in a direction towards the trigger pin (33) between the seal (49) provided in the valve (32) and the outside and prevents a flow of pressure medium into the valve.

15. An adjustment device in accordance with claim 11, wherein the at least one seal (19, 49) preventing a flow to the outside of pressure medium and the at least one seal (14, 46, 70, 71) preventing an inflow of gas and in particular of liquid from the outside are arranged directly adjacent to each other.

* * * * *